Jan. 22, 1957  C. W. SAUCERMAN  2,778,675
COMBINED AUTOMOBILE HOOD ORNAMENT AND BUG DEFLECTOR
Filed Dec. 6, 1954

Clarence W. Saucerman
INVENTOR.

United States Patent Office 2,778,675
Patented Jan. 22, 1957

2,778,675

COMBINED AUTOMOBILE HOOD ORNAMENT AND BUG DEFLECTOR

Clarence W. Saucerman, Salem, Wis.

Application December 6, 1954, Serial No. 473,147

4 Claims. (Cl. 296—91)

The present invention relates to new and useful improvements in deflectors for the hood of an automobile or other motor vehicle for deflecting bugs or insects, dust or other foreign particles from striking and obstructing the vision of the windshield of the automobile.

An important object of the invention is to provide adjustable deflecting vanes attached to a support mounted on the hood of the automobile and shaping the support to represent the fuselage or body of an airplane whereby when the deflecting vanes are folded downwardly the same will simulate the wings of an airplane to thus provide an ornament for the hood of the automobile when the deflector is not in use.

Another object of the invention is to connect the vanes or wings of the deflector to the supporting body by swivel means frictionally held in adjusted position to facilitate the movement of the vanes into and out of deflecting position.

A still further object is to provide a device of this character of simple and practical construction, which is neat and attractive in appearance, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
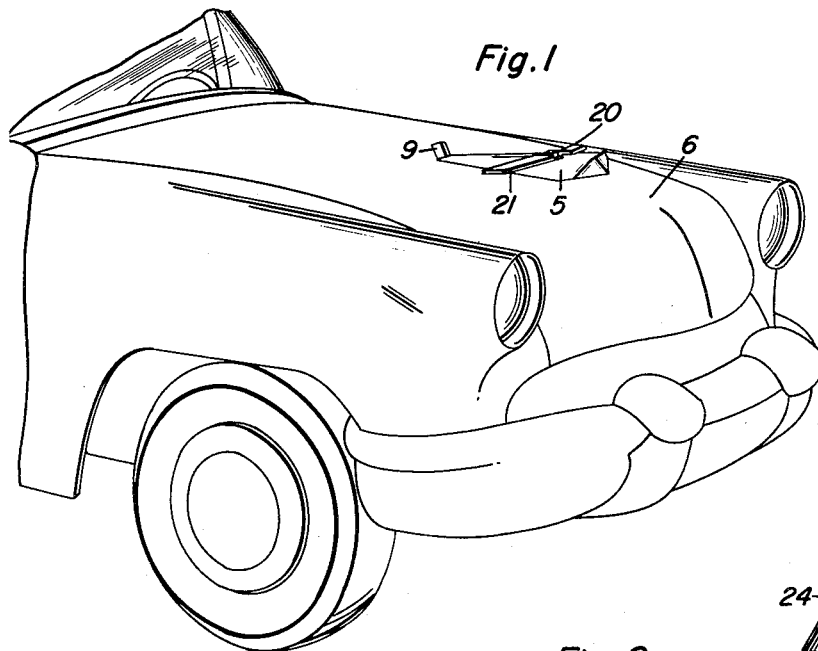
Figure 1 is a perspective view showing the vanes arranged in position to simulate the wings of an airplane.
Figure 2:
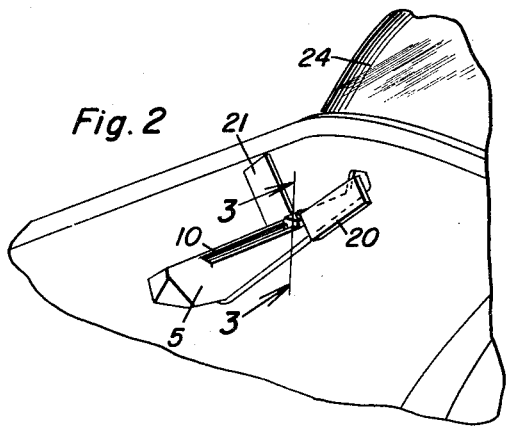
Figure 2 is a similar view showing the vanes raised into deflecting position.

Referring now to the drawing in detail wherein for the purpose of illustration I have disclosed a preferred embodiment of the invention, the numeral 5 designates an elongated hollow body which is open at its bottom and tapered toward its rear end and attached to the hood 6 of an automobile by bolts and nuts or other suitable fasteners 7. A rubber or other suitable padding 8 is positioned under the bottom of the body 5 to protect the finish of the hood of the automobile. The rear end of the body 5 is formed with an upstanding fin 9 simulating a rudder.

The top of the body 5 is formed with a longitudinal slot 10 to slidably receive a bolt 11 having a knurled nut 12 threaded at its upper end. A lower clamping block 13 is positioned on the lower portion of the bolt for clamping at the underside of the body 5 and a pair of co-acting clamping blocks 14 and 15 are positioned on the upper portion of the bolt 11 on top of the body 5. The clamping blocks 13, 14 and 15 form a slide for travelling forwardly and rearwardly on the body 5.

The opposite side edges of the blocks 14 and 15 are formed with matching notches 16 and 17 leading from opposed concave recesses 18 and 19 in the opposing faces of the clamping blocks 14 and 15.

A pair of vanes or wings 20 and 21 of quadrangular shape are each provided with a rod 22 which projects outwardly at one narrow end of the wing or vane and the outer end of the rod is formed or provided with a ball 23 swively positioned in the recesses 18 and 19.

Figure 3:
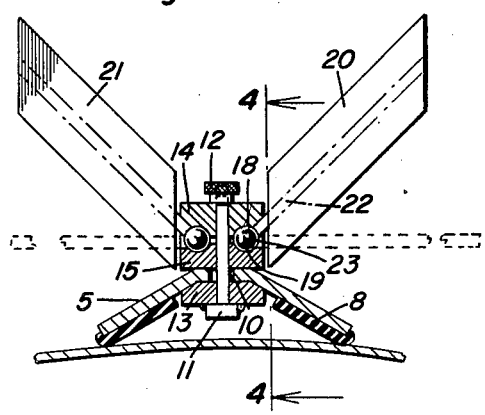
Figure 3 is an enlarged transverse sectional view taken on a line 3—3 of Figure 2.
Figure 4:
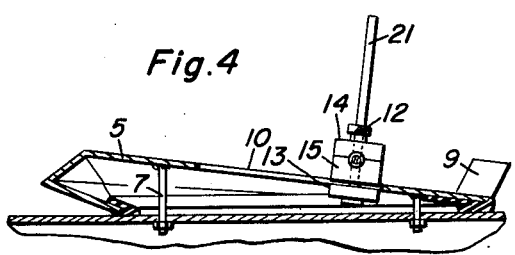
Figure 4 is a longitudinal sectional view taken on a line 4—4 of Figure 3.
Figure 5:
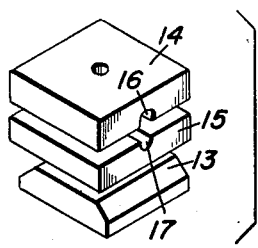
Figure 5 is a group perspective view of the friction clamping blocks which hold the vanes in adjusted position.

The notches 16 in the upper clamping block 14 are inclined upwardly so that the wings or vanes 20 and 21 may be supported in an upwardly inclined position, as shown in Figure 3 of the drawing, and when the clamping blocks are moved rearwardly in the slot 10, the wings or vanes will be positioned closer to the windshield 24 of the automobile to thus provide a deflector for bugs, dust and other foreign particles. The balls 23 at the inner ends of the vanes 20 and 21 are frictionally retained in the recesses 18 and 19 by tightening the nut 12.

When the wings or vanes 20 and 21 are not desired for use as a deflector, the clamping blocks are moved forwardly in the slot 10 toward the front end of the body 5 and the wings or vanes turned about the axis of the rods 22 to position the wings or vanes horizontally and in an outwardly projected position, as shown in Figure 1 of the drawing, to simulate an airplane.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

It will be understood the wings may be mechanically as well as manually adjusted.

What is claimed as new is as follows:

1. A bug deflector for motor vehicles comprising an elongated body adapted for attaching on top of the hood of the vehicle in front of the windshield thereof, a pair of quadrangular shaped wings, ball and socket means swively connecting the wings to the body in an outwardly projecting position at opposite sides thereof, and clamping means for the ball of said ball and socket means securing the wings in adjusted position to project either horizontally or in an edgewise upstanding position from the body.

2. A bug deflector for motor vehicles comprising an elongated body adapted for attaching on top of the hood of the vehicle in front of the windshield thereof, said body having a longitudinal slot therein, a slide in the slot, clamping means carried by the slide and securing the latter in longitudinally adjusted position in the slot, and a pair of wings carried by the slide and projecting outwardly at opposite sides of the slide.

3. A bug deflector for motor vehicles comprising an elongated body adapted for attaching on top of the hood of the vehicle in front of the windshield thereof, a clamping member attached to the body, and a pair of wings, and ball and socket means swively connecting one end of the wings to the clamping member and supported by the latter in either an edgewise horizontal or edgewise upstanding outwardly projecting position at opposite sides of the body.

4. A bug deflector for motor vehicles comprising an elongated body adapted for attaching on top of the hood of the vehicle in front of the windshield thereof, a clamping member attached to the body, a pair of quadrangular shaped wings, and swivel attaching means at one end of the wings and attached to the clamping member for supporting the wings in an outwardly projecting upwardly inclined edgewise upstanding position at opposite sides of the body, and said wings being rotatable about their longitudinal axes to adjust the wings into an outwardly projecting position at a horizontal plane.

References Cited in the file of this patent

UNITED STATES PATENTS

| | | |
|---|---|---|
| 1,832,357 | Brown et al. | Nov. 17, 1931 |
| 1,846,595 | Hawes | Feb. 23, 1932 |
| 2,074,897 | Everts | Mar. 23, 1937 |
| 2,112,709 | Reynolds | Mar. 29, 1938 |
| 2,710,772 | Schulein | July 14, 1955 |

FOREIGN PATENTS

| | | |
|---|---|---|
| 366,733 | Great Britain | Feb. 11, 1932 |
| 379,010 | Great Britain | Aug. 25, 1932 |